United States Patent [19]

Sindorf

[11] Patent Number: 5,059,496
[45] Date of Patent: Oct. 22, 1991

[54] NICKEL-HYDROGEN BATTERY WITH OXYGEN AND ELECTROLYTE MANAGEMENT FEATURES

[75] Inventor: John F. Sindorf, Pewaukee, Wis.
[73] Assignee: Globe-Union Inc., Milwaukee, Wis.
[21] Appl. No.: 328,117
[22] Filed: Mar. 23, 1989
[51] Int. Cl.$^5$ .............................................. H01M 10/34
[52] U.S. Cl. ...................................... 429/101; 429/154
[58] Field of Search ......................... 429/101, 153, 154

[56] References Cited

U.S. PATENT DOCUMENTS

| | | | |
|---|---|---|---|
| 4,17,328 | 12/1979 | Rogers | 429/101 X |
| 3,080,445 | 3/1963 | Brown | 429/183 |
| 3,669,744 | 6/1972 | Tsenter et al. | |
| 3,867,199 | 2/1975 | Dunlop et al. | |
| 3,975,210 | 8/1976 | Warnock | |
| 4,038,461 | 7/1977 | Warnock | |
| 4,074,018 | 2/1978 | Haas et al. | 429/101 X |
| 4,115,630 | 10/1978 | Van Ommering et al. | |
| 4,117,206 | 10/1978 | Plust et al. | |
| 4,127,703 | 11/1978 | Holleck | |
| 4,215,184 | 7/1980 | Gutmann et al. | |
| 4,327,158 | 4/1982 | Holleck | |
| 4,379,186 | 2/1983 | McCartney et al. | 429/154 |
| 4,567,119 | 1/1986 | Lim | 429/101 X |
| 4,584,249 | 4/1986 | Smithrick | 429/101 X |

OTHER PUBLICATIONS

Warnock, "Design of Nickel-Hydrogen Cells for Spacecraft", *Proceedings of Symposium on Battery Design and Optimization*, S. Gross, ed., The Electrochemical Society (1979), pp. 163–178.

*Primary Examiner*—Stephen J. Kalafut
*Attorney, Agent, or Firm*—Foley & Lardner

[57] ABSTRACT

A nickel-hydrogen battery or cell having one or more pressure vessels containing hydrogen gas and a plurality of cell-modules therein. Each cell-module includes a configuration of cooperatively associated oxygen and electrolyte mangement and component alignment features. A cell-module having electrolyte includes a negative electrode, a positive electrode adapted to facilitate oxygen diffusion, a separator disposed between the positive and negative electrodes for separating them and holding electrolyte for ionic conductivity, an absorber engaging the surface of the positive electrode facing away from the separator for providing electrolyte to the positive electrode, and a pair of surface-channeled diffusion screens for enclosing the positive and negative electrodes, absorber, and separator and for maintaining proper alignment of these components. The screens, formed in the shape of a pocket by intermittently sealing the edges together along as many as three sides, permit hydrogen gas to diffuse therethrough to the negative electrodes, and prevent the edges of the separator from swelling. Electrolyte is contained in the cell-module, absorbhed by the electrodes, the separator and the absorber.

32 Claims, 6 Drawing Sheets

NICKEL-HYDROGEN BATTERY WITH OXYGEN AND ELECTROLYTE MANAGEMENT FEATURES

TECHNICAL FIELD

This invention relates to electric storage batteries, and more particularly, to nickel-hydrogen batteries.

BACKGROUND OF THE INVENTION

Substantial research has been directed toward new battery systems which are lightweight, long lived, low volume, and require little or no maintenance. In particular, development of new rechargeable, electric batteries has been an area of active research.

The nickel-hydrogen battery is one such electric storage system which offers many advantages including high specific energy, long cycle life, state-of-charge indication, and tolerance of overcharge, overdischarge and reversal. Development of this battery has been mainly directed toward aerospace applications. However, research programs are now active in developing the battery for use in terrestrial applications, although these batteries are not yet commercially available. While cost has generally not been a limiting factor in aerospace developments, on a cost per cycle basis, nickel-hydrogen batteries have been found to be competitive with other rechargeable systems.

Batteries or cells are devices that convert chemical energy contained in materials directly into electrical energy by means of an electrochemical oxidation-reduction reaction. This type of reaction involves the transfer of electrons from one material to another through an electrical circuit. The basic electrochemical unit is a "cell". A "battery" consists of one or more cells, connected in series or parallel, or both, depending on the desired output voltage and capacity.

A basic cell unit consists of three major components: (1) an anode, or negative electrode, which gives up electrons to the external circuit and is oxidized during the electrochemical reaction; (2) a cathode, or positive electrode, which accepts electrons from the external circuit and is reduced during the electrochemical reaction; and (3) an electrolyte, or ionic conductor, which provides the medium for transfer of electrons, as ions, inside the cell between the anode and the cathode. The electrolyte is typically a liquid with dissolved salts, bases or acids to impart ionic conductivity. Some cells, however, use solid electrolytes.

Physically, the anode and cathode electrodes are isolated in the cell to prevent internal short-circuiting but are surrounded by the electrolyte. A separator material is typically used to mechanically separate the anode and cathode. The separator is permeable to electrolyte in order to maintain the desired ionic conductivity.

Secondary batteries are rechargeable, that is, able to go through a series of discharge-charge cycles. In these batteries, electrons flow from the anode to cathode on discharge. On recharge, electrons are delivered to the anode so that the anode and/or cathode are restored to their original form. Secondary batteries generally have good energy densities, high discharge rates and good low temperature performance. Their energy densities are generally lower than those of primary, i.e., non-rechargeable, batteries. Their charge retention on standing is also poorer than most primary batteries.

The most advantageous combinations of anode and cathode materials are those that will be the lightest in weight and give high cell voltage and capacity. Such combinations may not always be practical, however, due to factors such as reactivity with other cell components, difficulty in handling and high cost. In a practical design, the anode selected operates efficiently, has good conductivity, is stable, and is easily fabricated at low cost. The cathode must also operate efficiently and be stable when in contact with the electrolyte.

The major components of a nickel-hydrogen cell are a nickel hydroxide electrode, a hydrogen catalytic electrode, a separator, an electrolyte, typically an alkali-metal hydroxide, such as potassium hydroxide, and hydrogen gas. A gas-diffusion or gas-permeable plate or screen is typically included to facilitate hydrogen diffusion into the back of the hydrogen electrode. The components of one or more cells are housed within a vessel so designed to contain the hydrogen gas under pressure. A multiple of cells would be connected electrically either in series or in parallel.

The nickel hydroxide electrode of a nickel-hydrogen cell is usually designated the "cathode" or positive electrode, and the hydrogen catalytic electrode is usually designated the "anode" or negative electrode. During discharge, when the cell is connected to an external load, electrons flow from the anode or negative electrode, i.e., the hydrogen electrode, where hydrogen is oxidized to water, through the external load to the cathode or positive electrode, i.e., the nickel electrode, where nickel oxyhydroxide is reduced to nickel hydroxide. During charge, the current flow is reversed and oxidation takes place at the nickel electrode and reduction at the hydrogen electrode, i.e., the nickel hydroxide is oxidized to nickel oxyhydroxide and hydrogen gas is reformed from reduction of water. Thus, after recharge, the battery reverts to its original chemical state.

The positive electrode is typically comprised of electroactive material on a conductive medium. The negative electrode is generally a plastic bonded, metal powder plate in which the metal, for example, platinum, will catalyze hydrogen oxidation in an aqueous medium. The catalytic electrode theoretically undergoes no physical or chemical changes itself, and is, thus, very stable and depth-of-discharge has virtually no effect on it. This electrode is often constructed with an electrolyte wettable side and an electrolyte nonwettable side to facilitate hydrogen gas access. The wettable side faces the separator and the nonwettable side faces the gas diffusion screen.

The separator is sufficiently thick to prevent short circuit contact between the electrodes yet sufficiently absorbent to hold an appropriate quantity of electrolyte to allow the electrochemical reactions to occur in the cell. The electrolyte is primarily held within the separator and the electrodes.

Various prior art nickel-hydrogen cell stack designs are known. The term "cell stack" refers to an assembly of a one or more basic cell units. The term "cell stack configuration" refers to the positioning of the basic cell components with respect to one another. Such positioning generally relates to controlling various supporting features of cell design, such as oxygen and electrolyte management, as will be explained below.

One type of cell stack configuration is the so-called back-to-back arrangement in which two basic cell units are paired with the positive or negative electrodes back-to-back. In a back-to-back, positive electrode configuration, for example, the cell stack for the cell-unit pair consists of, in consecutive order, a first diffusion screen, a first negative electrode, a first separator, the two positive electrodes, a second separator, a second negative electrode and a second diffusion screen. See, for example, Van Ommering, et al., U.S. Pat. No. 4,115,630, issued Sept. 19, 1978; Holleck, U.S. Pat. No. 4,127,703, issued Nov. 28, 1978; Warnock, U.S. Pat. No. 4,038,461, issued July 26, 1977.

Another cell stack design uses only one positive electrode with two negative electrodes positioned on either side and separated by a separator. See, for example, Dunlop et al., U.S. Pat. No. 3,867,199, issued Feb. 18, 1975; Plust et al., U.S. Pat. No. 4,117,206, issued Sept. 26, 1978; Gutmann et al., U.S. Pat. No. 4,215,184, issued July 29, 1980.

Other nickel-hydrogen cell designs have simply used alternating positive electrode-negative electrode couples, with a separator between each positive and negative electrode. See, for example, Tsenter et al., U.S. Pat. No. 3,669,744, issued June 13, 1972.

Various problems, however, have been encountered in the design and structure of nickel-hydrogen cells and batteries, particularly in proposed aerospace applications where available space is minimal, making high energy density a necessity. The present limitations of the nickel-hydrogen cells and batteries are due primarily to deficiencies in the supporting aspects of cell design rather than, for example, in electrode technology. Limitations can be cured by developing cell design features which are not in themselves life limiting.

A persistent and vexatious problem, largely unattended by the prior art, and caused to some extent by the constraints imposed by the aerospace applications, is the lack of proper oxygen and electrolyte management. Evolution of oxygen near the end of charge and during overcharge can produce undesirable effects within the cells and can impose undesirable constraints in the design and operation of cells. Oxygen is evolved at the cathode during overcharge because the cathode reaches an end point corresponding to the fully oxidized state of the nickel hydroxide. At the same time, the anode has no such end point since it continues to consume water to produce hydrogen gas. Since no effective method has been found to eliminate oxygen evolution completely, various means of recombining the oxygen with hydrogen to form water with minimal disruption of cell operation have been sought. Ideally, the rate of oxygen recombination should equal the rate at which oxygen is generated. Oxygen produced within a cell should be recombined to form water within the same cell.

Generally, past aerospace cells had uncontrolled oxygen recombination. Pockets of oxygen built up, resulting in rapid recombination with hydrogen, which caused burn holes to appear in the negative electrode and melting of plastic separators, if such were used, because of the locally excessive heat released.

Oxygen management can also be compromised by separator swelling when fuel cell grade asbestos is used as the separator material. In order to achieve the long cycle life of which a nickel-hydrogen cell or battery is capable, use of surplus electrolyte is necessary because morphology changes in the nickel electrode result in increased propensity of this electrode to hold electrolyte as a function of cycling. The separator border, however, often swells from soaking up the excess electrolyte, sometimes three or four times its original thickness, blocking orderly migration of oxygen to the negative electrode where it can be converted to water.

Electrolyte management is also essential in a nickel-hydrogen cell design because so many factors work against it. The storage of hydrogen in the pressure vessel provides a volume into which electrolyte can escape. Cell operation tends to force electrolyte out of the electrode stack mainly by displacement, but also by entrainment. As oxygen bubbles form in the cathode and move, they push electrolyte out of the cathode and the separator. Moving gases, such as the bubbles, may also entrain electrolyte. When oxygen bubbles break at the perimeter of the cathode, a fine mist of entrained electrolyte is released to the hydrogen gas space of the cell. Loss of electrolyte results in progressive reduction of accessible electrode active material and of the ion conducting pathways between anode and cathode.

Electrolyte concentration gradients can result from uneven production of water, e.g., when oxygen recombination is unevenly distributed over the surface of the hydrogen catalytic electrode. Electrolyte gradients can cause current density gradients and related imbalances in cell operation which degrade performance and life. Water in the electrolyte can also be lost by evaporation from a hot electrode stack and condensed on the cool interior walls of the pressure vessel.

Yet another electrolyte management problem results from use of certain types of diffusion screens. The diffusion screens of the prior art were normally a woven material. The woven screens have a propensity to trap the potassium hydroxide electrolyte during cycle testing of the cell and if charged with the electrolyte under vacuum. Electrolyte so trapped in the screens reduces gas access to the negative electrodes, and, hence, reduces the cell performance.

Another deficiency in the supporting aspects of cell design involves mechanical integrity. Typically, many basic cell units must be stacked to achieve the desired capacity of a cell. This requires proper physical alignment of a large number of cell components. Separators must physically isolate positive and negative electrodes. Diffusion screens must be positioned on the surface of the negative electrode to facilitate hydrogen gas access. Often, for example, screens slip against the polytetrafluorothylene used as the nonwettable surface of the negative electrode.

Various prior art cells have attempted to control some of the oxygen, electrolyte and mechanical problems explained above by modifying the cell stack design, or by changing the the physical properties or size of cell components.

One nickel-hydrogen cell, which uses a back-to-back positive electrode arrangement, utilizes two electrolyte matrices, each backed with a microporous hydrophobic membrane, between the back-to-back electrodes. The matrices, which consist of a nonwoven polymeric fabric, attempt to manage the electrolyte by taking up electrolyte displaced from its normal location in and between the electrodes by evolved gases and returning it to its normal location. The membrane, which consists of porous polymer, permits gas and vapor therethrough while being impermeable to the liquid electrolyte. See, Holleck, U.S. Pat. No. 4,127,703, issued Nov. 28, 1978.

In another cell design, electrolyte reservoirs positioned either against the walls of the pressure vessel or walls of a cell case are employed as wicks for electrolyte. See Warnock, "Design of Nickel-Hydrogen Cells for Spacecraft", *Proceedings of Symposium on Battery Design and Optimization*, S. Gross, ed., The Electrochemical Society (1979), pp. 163-178; Holleck, U.S. Pat. No. 4,327,158, issued, Apr. 27, 1982.

Yet another nickel-hydrogen cell discloses an electrode stack arrangement as the recirculating design in which the positive and negative electrodes are stacked alternately with the nickel electrode of one cell unit facing the hydrogen catalytic electrode of the next. This arrangement allows for oxygen generated in the cathode of one cell unit to recombine over the entire surface of the hydrogen electrode of the next. This cell also provides a conduit external to the cell stack for returning the oxygen at one end of the stack to the other end for oxygen-hydrogen recombination. This oxygen return scheme prevents asymmetric buildup of water in cell stack. See, Warnock, U.S. Pat. No. 4,038,461, issued July 26, 1977.

Various techniques have also been used to insure proper alignment of all cell components and prevent swelling of components. The so-called "pineapple slice" configuration utilizes cell components, including two stack end plates, which are annular and have a central aperture through which a rod or screw is placed and bolted at either or both ends to hold the stack fast See, for example, Warnock, U.S. Pat. No. 3,955,210, issued Aug. 17, 1976; Plust et al., U.S. Pat. No. 4,117,206, issued Sept. 26, 1978. Another design uses bolts and end plates but the apertures are not centrally located. See, for example, Dunlop et al., U.S. Pat. No. 3,867,199, issued Feb. 18, 1975.

In the assembly of cells into batteries, yet another electrolyte management problem is electrolyte bridging between the cells of the battery. Electrolyte bridging between adjacent cells results in undesirable parasitic shunt currents within the battery. Parasitic shunt currents limit the performance, especially long life, of a battery.

One prior art battery, which utilizes the positive electrodes in a back-to-back configuration, uses a cell case to separate cell pairs or stacks from each other. The cell separator is hydrophobic and prevents electrolyte bridging between adjacent modules because it is nonporous in the direction perpendicular to the electrode face. The cell case or envelope may also contain scratches or grooves or a thin plastic screen on each surface to provide a gas transport layer to facilitate gas access to the surfaces of the negative electrodes. See, Van Ommering, U.S. Pat. No. 4,115,630, issued Sept. 19, 1978.

A further improvement on the above battery involves using a plurality of electrode stacks encased in hydrophobic cups having a gap between them. The gap is sufficient to allow gas stored within the pressure vessel to enter each stack, but also to inhibit electrolyte bridging. See, Holleck, U.S. Pat. No. 4,327,158, issued Apr. 27, 1982.

Another battery utilizes a porous material, with a wettable surface between negative electrodes which are positioned back-to-back. The cell unit pairs are contained within a plastic cell case. The case is made of a nonwetting material and constructed to permit hydrogen gas flow into the case but to restrict electrolyte from leaving. See, Warnock, U.S. Pat. No. 3,975,210, issued Aug. 17, 1976.

Despite recognition of practical cell and battery design problems, proper solution to all these problems in a single cell or battery design has not been demonstrated in the prior art. The present invention provides a nickel-hydrogen cell and battery with improved and cooperative oxygen and electrolyte management and component alignment features.

SUMMARY OF THE INVENTION

This invention is directed to a nickel-hydrogen battery or cell having one or more pressure vessels containing hydrogen gas and a plurality of cell-modules therein. A cell-module having electrolyte includes a negative electrode, a positive electrode adapted to facilitate oxygen diffusion, a separator disposed between the positive and negative electrodes for separating them and holding electrolyte for ionic conductivity, an absorber engaging the surface of the positive electrode facing away from the separator for providing electrolyte to the positive electrode, and a pair of surface-channeled diffusion screens for enclosing the positive and negative electrodes, absorber, and separator and for maintaining proper alignment of these components. The screens permit hydrogen gas to diffuse therethrough to the negative electrodes, and prevent the edges of the separator from swelling. The screens are formed in the shape of a pocket by intermittently sealing the edges together along as many as three sides and, if desired, part of the fourth side. One surface of each negative electrode engages a gas diffusion screen, and the other surface engages the separator. One surface of each positive electrode engages the separator and the other surface the absorber. Electrolyte is contained in the cell-module, absorbed by the electrodes, the separator and the absorber.

In a preferred embodiment, a cell-module comprises a pair of basic cell units with the positive electrodes positioned in a back-to-back arrangement all within a diffusion screen pocket Typically, a plurality of cell-modules, are placed in a nonporous housing to form a cell. A cell consists of one or more cell-modules; the number of cell-modules depends on the cell capacity required Cell-modules and cells so constructed may be appropriately used to assemble an individual pressure vessel cell ("IPV") or an individual cell/common pressure vessel battery ("IC/CPV"). An IPV would typically consist of a plurality of physically restrained cell-modules, electrically connected in parallel, and placed in an individual pressure vessel. A battery would consist of a plurality of IPV cells.

An IC/CPV would consist of a plurality of cells contained in a common pressure vessel, each cell consisting of, typically, a plurality of cell-modules, and each in an individual housing. The housing allows communication from its interior to the interior of a pressure vessel through a gas port and can include electrolyte reservoirs for storing or collecting any free electrolyte. The gas port allows flow of hydrogen gas into and out of the housing, yet prevents exit of electrolyte from the cell.

Each cell-module includes a configuration of cooperatively associated oxygen and electrolyte management and component alignment features. This configuration is characterized by each module having its own plastic diffusion screen pocket, one purpose being to prevent the separator edges from swelling, an absorber between the positive electrodes and, typically, a grooved surface positive electrode. The absorber permits lateral diffusion of electrolyte to the positive electrode to maintain it in a thoroughly wetted state. The grooved nature of the positive electrodes provides passageways along the surfaces, permitting gaseous oxygen evolved at the positive electrodes to migrate to the perimeter of the positive electrodes without expelling electrolyte. After diffusing out from the positive electrodes, the oxygen is free to recombine with hydrogen gas to form water at the negative electrodes.

Each cell-module also includes features for wicking and draining of the electrolyte. The absorber wicks up free electrolyte accumulating in the electrolyte reservoirs of the housing at a rate required to maintain wetness and provides passageways for the electrolyte to the positive electrode. The ribbed type diffusion screens promote electrolyte drainage from between the surfaces of adjacent negative electrodes.

Each individual cell housing promotes the recycling of water vapor and/or electrolyte mist due to its nonporous character. On the inside surfaces of the housings, water vapor can condense and electrolyte mist (entrained in the generated hydrogen and oxygen) will collect, particularly during the charge phase. These liquids will return to the reservoirs by force of gravity, and be wicked back into the stack by the absorber. The absorbers promote uniformity of electrolyte quantity from cell-module to cell-module within each cell housing. Electrolyte for each cell is contained within its own housing and there is no bridging of electrolyte between cells.

BRIEF DESCRIPTION OF THE DRAWING

The preferred exemplary embodiment of the present invention will hereinafter be described in conjunction with the appended drawing, wherein like designations denote like elements, and.

DETAILED DESCRIPTION

Cell Reactions

In normal operation, the electrode reactions for a nickel-hydrogen cell are represented as follows:

Nickel Electrode: NiOOH + H$_2$O +

Hydrogen Electrode:

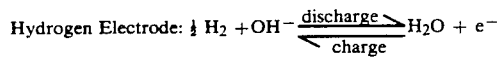

Net Reaction:

Electrochemically, the half-cell reactions at the nickel hydroxide electrode are similar to those occurring at the corresponding electrode in the nickel-cadmium system. On discharge, nickel oxyhydroxide is reduced to nickel hydroxide, while, on charge, nickel hydroxide is oxidized to nickel oxyhydroxide. At the negative electrode, hydrogen gas is oxidized to water during discharge and is reformed, during charge, from electrolysis of the water. As can be seen from these reaction equations, the pressure of hydrogen in the cell varies with the extent of discharge, i.e., as the extent of discharge increases, the hydrogen pressure decreases. Thus, the state of charge of the nickel-hydrogen cell is easily determined.

If the nickel-hydrogen cell is overcharged, the following reactions occur:

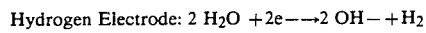

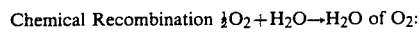

Formation of water from oxygen generated at the positive electrode and hydrogen at the negative electrode is the net reaction occurring on overcharge. To prevent oxygen buildup, the oxygen must recombine with hydrogen at the catalytic surfaces of the negative electrode to form the water. Oxygen recombination at the catalytic sites occurs rapidly. Theoretically, therefore, even at high rates of overcharge, there should be no significant build-up of oxygen in the hydrogen gas. Even with continuous overcharge, there should also be no change in the electrolyte concentration or in the amount of water in the cell.

DEFINITIONS

For the purposes of this application, the term "cell unit" describes a positive electrode, a negative electrode and a separator. As best illustrated in the exploded perspective of FIG. 1 and sectional view of FIG. 3, a "cell-module" comprises cell units, preferably a pair of cell units stacked such that the positive electrodes are in a back-to-back arrangement sandwiched between two separators and two negative electrodes and enveloped in a gas diffusion screen pocket. The term "cell" describes one or more cell-modules, as shown in FIG. 2. Two or more cells connected in series constitute a "battery." Two or more cell-modules connected in parallel constitute a cell in the context of an IPV cell.

Cell-Module

Figure 1:
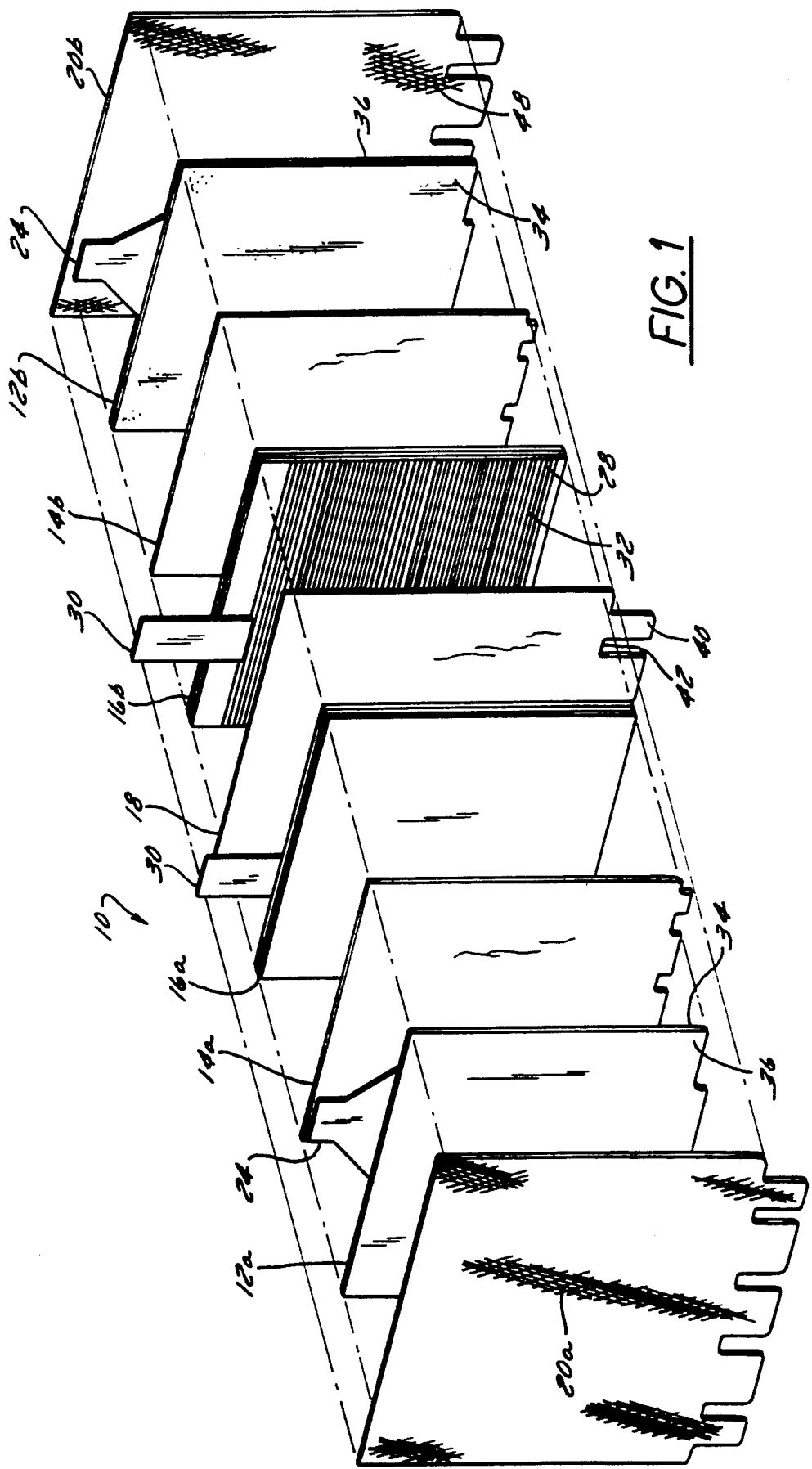
FIG. 1 is an exploded perspective view of a cell-module enclosed within a pocket formed by diffusion screens illustrating the positioning of the module components, a portion broken away to show the grooves formed in one of the positive electrodes, all in accordance with the present invention.
Figure 2:
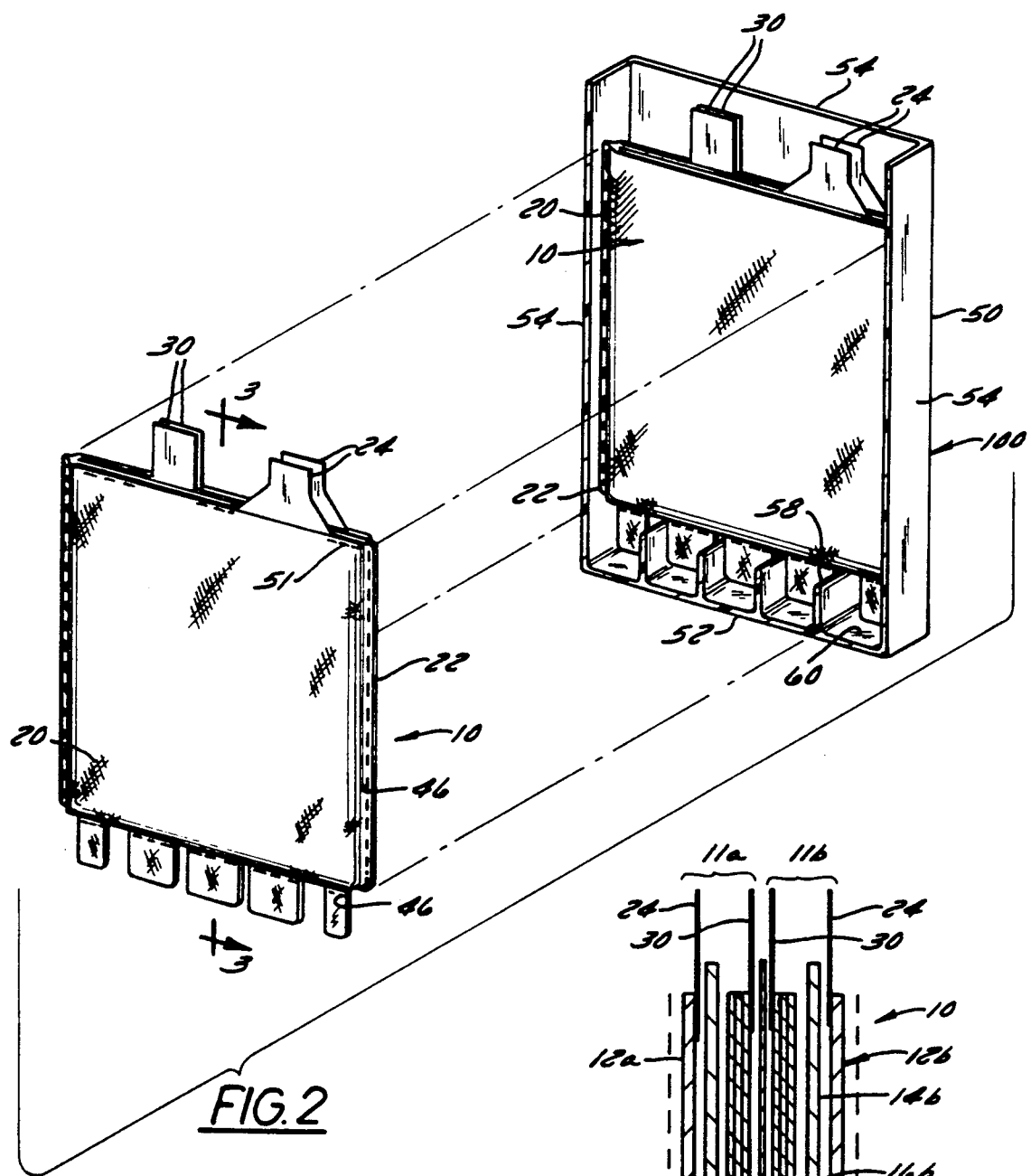
FIG. 2 is an exploded perspective view of a cell with a portion of the housing broken away to illustrate the positioning of one or more cell-modules therein.
Figure 3:
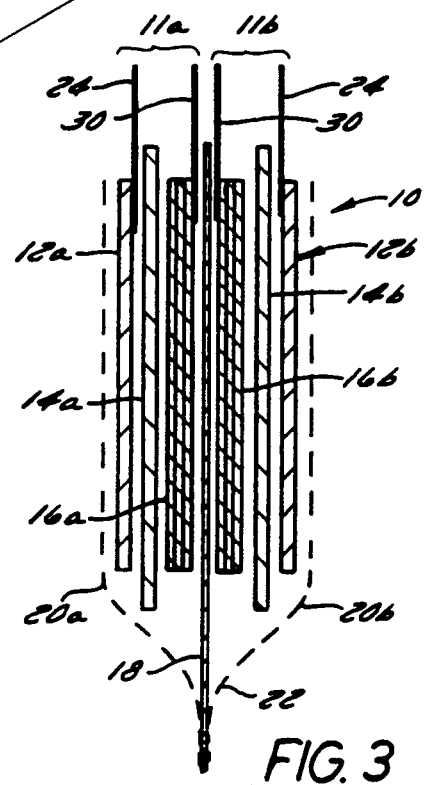
FIG. 3 is a sectional view of a cell-module taken at the plane 3—3 in FIG. 2.

Referring particularly now to FIGS. 1 and 3, it may be seen that a cell-module, generally designated 10, preferably includes two cell units 11a and 11b stacked such that the positive electrodes 16a and 16b are in a back-to-back arrangement. The arrangement of components of cell module 10 includes, in succession, a first negative electrode 12a, a first separator 14a, a first positive electrode 16a, an absorber 18, a second positive electrode 16b, a second separator 14b, and a second negative electrode 12b. It should be noted that absorber 18 is positioned between electrodes 16a and 16b. These components are enveloped by two gas diffusion screens 20a and 20b (both shown in FIG. 3 as dashed lines) appropriately sealed, as will be explained hereinafter, to form a pocket. Electrolyte is absorbed by the electrodes, separators and absorber.

Extending upward from each negative electrode 12 is an electrode tab 24. Similarly, each positive electrode 16 is provided with a electrode tab 30.

Positive electrodes 16a and 16b may be conveniently constructed as plates about 14 cm×12 cm ×0.2 cm of a sintered nickel structure, usually of a porosity in the range of 75-85%, and electrochemically impregnated with electroactive material, such as, for example, Ni(OH)$_2$. They have a form commonly used both in nickel-cadmium batteries and in the state of the art nickel-hydrogen batteries. Cobalt and/or cadmium additives may be added to the solution impregnating the porous nickel structure to improve cycle lifetime and utilization of the electroactive material. Additionally, the positive electrodes are subjected to the usual characterization and formation steps conventional in the art, i.e., electrolytic cycling in alkali metal hydroxide electrolyte for the purpose of improving the electrochemical properties of the electrodes. It has been found that the current density of such positive electrodes is typically 10 mA/cm$^2$ for 4 hour discharge.

To minimize the problem of channeling but to facilitate the appropriate recombination of oxygen at the negative electrode, it has been found that through the liberal use of passageways along the surface of the nickel electrode to the perimeters thereof, the oxygen generated during overcharge can rapidly move along such passageways and ultimately reach the surface edges of the hydrogen electrode. Thus, as shown in FIG. 1, the surface 32 of electrode 16b facing absorber 18 is provided with a plurality of parallel or widthwise grooves 28. It should be understood that the surface of electrode 16a (not seen) is similarly provided with grooves facing absorber 18.

Negative electrodes 12 may be fabricated from an electrically conducting nickel support screen to which a composition of 10% by weight platinum powder on carbon and polytetrafluorethylene are bonded. The loading is typically between about 0.2 and 0.6 mg Pt/cm$^2$, which provides suitable catalytic activity. Dimensionally, electrodes 12 are formed as plates of about 14 cm×12 cm×0.25 mm. The surface 36 of electrode 12 facing screen 20 is desirably coated with porous polytetrafluorethylene or material with similar characteristics. The other surface 34 of electrode 12 is the catalytic surface facing separator 14.

Each of the separators 14 are positioned between electrodes 12 and electrodes 16 and act as an electrolyte matrix, saturated with electrolyte with nearly a zero free pore volume. Such a saturated matrix typically does not allow oxygen generated at electrodes 16 to bubble through the electrolyte in the separator since separator 14, wetted and properly supported, is relatively impermeable to transport of gases. It is noted that the use of a relatively impermeable material as a separator is preferable to use of permeable materials, such as organic polymeric fiber materials. While permeable separators allow for rapid transport of oxygen generated at the positive electrode to the negative electrode, the oxygen thus transported is not evenly distributed across the face of the electrode 12. Because the pores of such a separator are distributed in size, oxygen will channel preferentially through the larger pores. This preferential channeling leads to more rapid oxygen recombination in some areas of the negative electrode surface than others, resulting in locally excessive heating and increased temperature. The locally high production of heat can cause melting and burning of polymeric fibers of the separators, creating even larger holes, which eventually result in cell failure. By appropriate use of impermeable materials for separators, however, oxygen is transported through and along the surfaces 32 of electrodes 16, facilitated by the grooves 28, to the positive electrode perimeters to reach the surface edges of the negative electrodes.

In the nickel-hydrogen cell-module design according to the present invention, separators may be made of various materials such as, for example, of potassium titanate, a fuel-cell grade asbestos or zirconia. Separators 14 are generally about 0.2-0.4 mm thick and are oversized in their dimensions to extend beyond the edges of the electrodes, thereby reducing the possibility of short-circuiting occurring between the positive and negative electrodes.

As stated before, and best seen in the preferred embodiment shown in FIG. 3, absorber 18 is positioned between the positive electrodes and engages surface 32 of each positive electrode 16. Sufficient electrolyte is inserted into a cell to thoroughly saturate the absorber 18 as well as the other components. Absorber 18 is suitably a plate of dimensions 14 cm×15 cm×0.3 mm and may have a plurality of wicks 40 which extend down from the main body portion thereof with recesses 42 therebetween. As will be described hereinafter in a more detailed relationship to a complete cell, wicks 40 function to extend into a reservoir of electrolyte to wick up any free electrolyte by capillary action. Wicks 40 and recesses 42 further provide an alignment function also to be described with respect to a complete cell.

Absorber 18 provides passage ways for the electrolyte and, thus, affords lateral movement of the electrolyte to the positive electrode, preventing or reducing dry spots on the positive electrodes, which decrease electrode performance. Maximum cell capacity is delivered by the positive electrodes when thoroughly wetted with electrolyte. Absorber 18 maintains wetness of the positive electrodes, thus improving their performance, especially at elevated temperatures. Moreover, as the morphology of the positive electrode changes with extensive cycling, the positive electrode swells and requires additional electrolyte; the absorber allows for these changes by giving up the required electrolyte to the positive electrode and providing room for the electrodes to swell through a compressing mode. If no means is provided in the cell-module for such expansion, cell performance decreases.

While many absorbent materials will function adequately as an absorber, the selected material must necessarily be nondegradable in the electrolyte and resistant to oxygen. Additionally, the selected material must have a capillary potential substantially sufficient to hold electrolyte, yet lower than that of the positive electrodes and separator, so that the absorber material does not draw, but instead supplies, electrolyte to the surface 32 of the positive electrode. Absorber 18 may, for example, be a non-woven polypropylene suitably treated to be hydrophilic. A non-woven plastic fiber appears to be a cost-effective choice.

The amount of electrolyte absorbed by absorber 18 will vary according to the size of the absorber, i.e., the larger the dimensions of the absorber, the more electrolyte it will absorb. Accordingly, the thickness of the absorber 18 may be increased to a size sufficient to contain all the electrolyte needed throughout cell lifetime, thus eliminating the need for any electrolyte reservoir and the problems associated with the pool of free electrolyte.

It is desirable to maintain proper alignment of the module components. Misalignment can cause, for example, short circuiting between nickel and hydrogen electrodes and problems in assembly of cells. Such alignment is advantageously accomplished by enclosing all components of a cell-module within a pocket 22 formed from two gas permeable or gas diffusion screens 20. As seen best in FIG. 5, the screens 20 are intermittently sealed along a line shown generally as character number 46 which forms a perimeter, typically around three or more sides of the module. Additionally, screens 20 may have extensions below line 46 which are dimensionally complimentary to wicks 40 of absorber 18 and abut both sides thereof. Seal line 46 is made intermittent so as to facilitate wicking of electrolyte into the component stack.

Each of the gas diffusion screens 20 engages surface 36 of a negative electrode 12, and being permeable, creates a gas space across the entire surface negative electrode 12, allowing diffusion of hydrogen to the catalytic surface 34 of negative electrode 12. Upon discharge, the hydrogen is converted to water at the catalytic sites.

The electrochemical reaction at the negative electrode is a complex, three-body, gas-transport reaction, requiring rapid and unimpeded diffusion of hydrogen into the catalytic sites of the electrode in the presence of hydroxide ions. Any wetting of surface 36 of the negative electrode with electrolyte acts as a barrier to hydrogen access. Screen 20 may be provided with a plurality of surface channels 48 which allow electrolyte to readily drain from surface 36 of the negative electrode 12, thus, facilitating rapid access of hydrogen to the negative electrodes.

Screens 20 may be suitably constructed of a perforated, polypropylene fabric of porosity of about 50% to 95%, for example, Delnet #R0412-10PR formerly produced by Hercules Corporation or #ON-3325 produced by Conwed Plastics Co., of about 0.25 mm in thickness and 15 cm in height and 14 cm in width. Both hydrophilic and hydrophobic materials may be employed giving the results as desired.

By enclosing of the components into pocket 22, module components are held in proper relationship and alignment with respect to each other, thus preventing shorts, and facilitating insertion of the cell modules into a housing, as explained below. Pocket 22 also provides a gas space into which oxygen may diffuse and maintains the edges of the negative electrodes exposed to this gas space, thus contributing to controlled oxygen recombination with hydrogen at the negative electrode.

Screen pocket 22 also prevents the edges of separator 14 from swelling by soaking up excess electrolyte and blocking off the pathway of oxygen to the negative electrode. If desired, a portion of the top edge 51 of pocket 22, where tabs 24 and 30 protrude, may also be partially sealed to prevent separator swelling along this edge.

Cells

Figure 4:
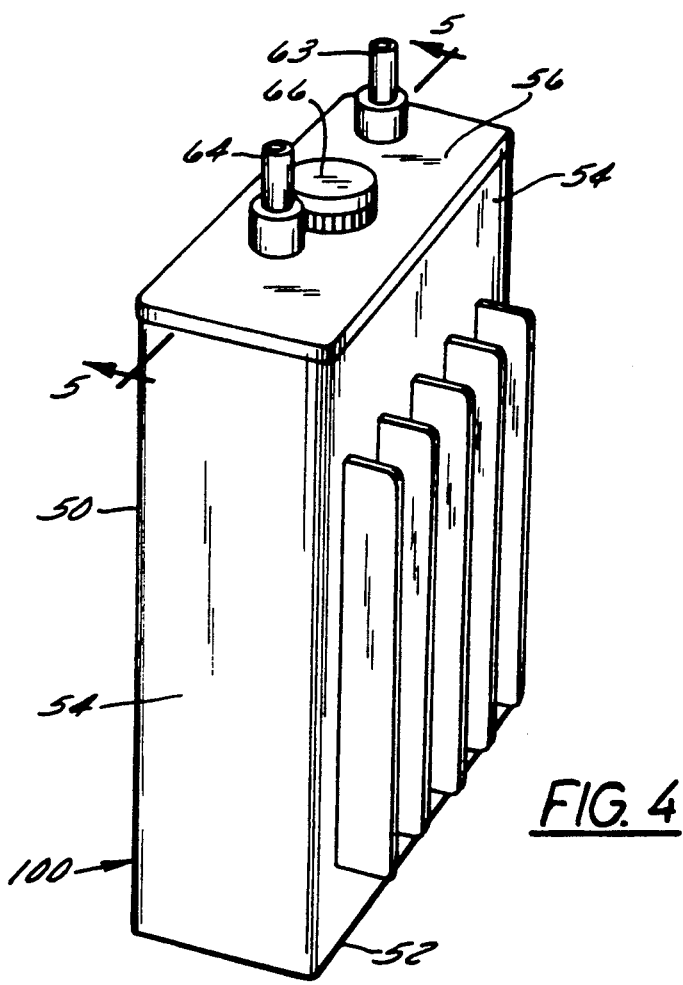
FIG. 4 is a perspective view of a cell and housing.

Referring to FIGS. 2 and 4, it may be seen that cell 100 preferably comprises a plurality of cell-modules 10 suitably contained in a housing 50. While the housing 50 may comprise any of a number of configurations, including simply a plastic bag, it is preferred that housing 50 be constructed of a thermoplastic material such as, for example, polypropylene, which is heat sealable and which has a nonporous surface characteristic. A separate housing for each cell prevents electrolyte bridging, which lowers cell performance due to shunt currents.

Figure 5:
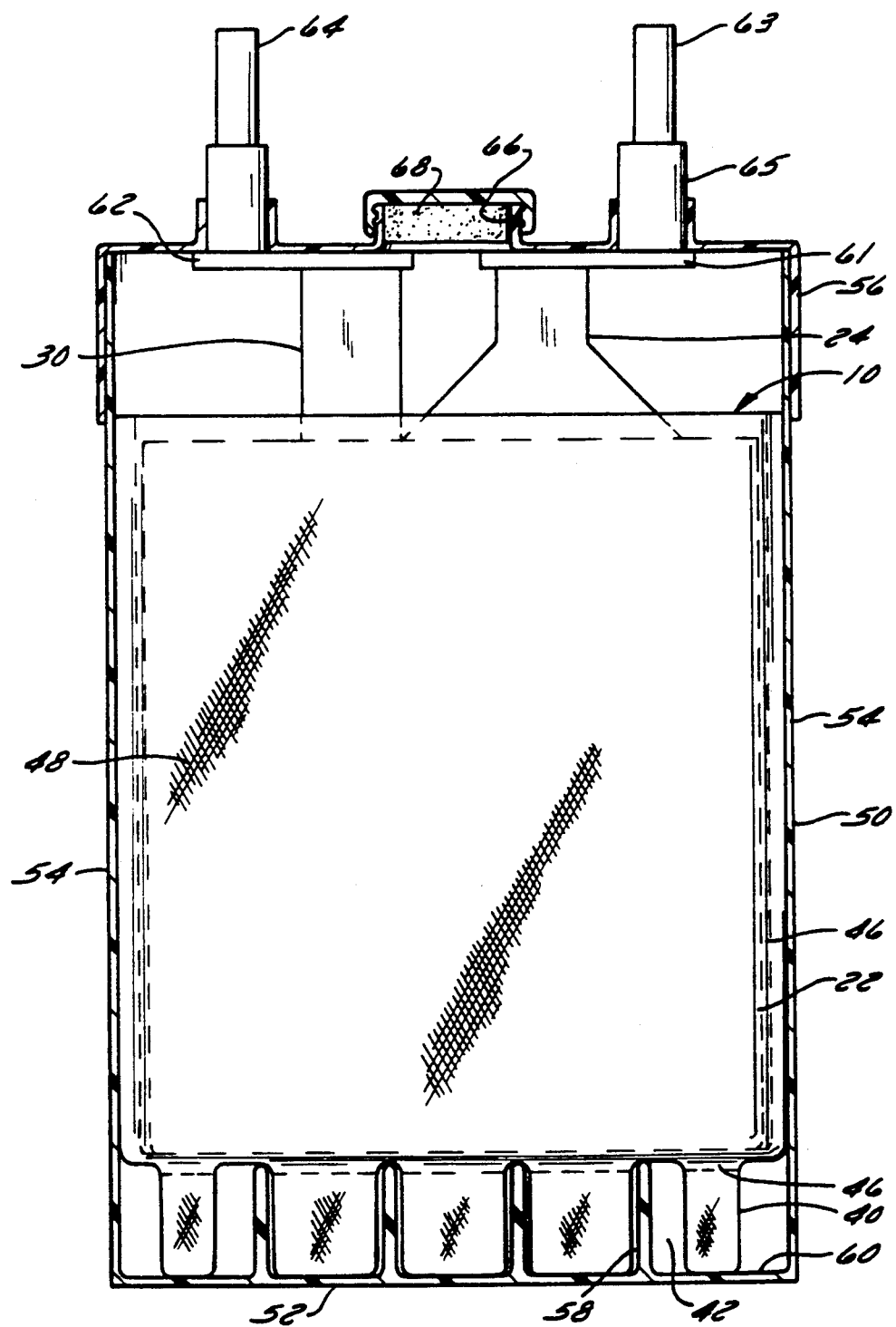
FIG. 5 is a sectional view of a cell taken at the plane 5—5 of FIG. 4.

The housing 50 of FIG. 2, 4 and 5 has a parallelpiped construction, generally injection molded, including a bottom 52, sides 54, cover 56, module rests 58 and electrolyte reservoirs 60. Cover 56 may be heat-sealed or otherwise adhered to housing sides 54.

Electrode tabs 24 and 30 extending from cell-modules 10 are collected and connected, respectively, to plates 61 and 62 which are, in turn, connected, respectively, to terminal posts 63 and 64, as best seen in FIG. 5. Electrode tabs may be electrically connected to plate 61 and 62, for example, through welding after positioning into slots machined in the plates. Tabs from all positive electrodes of the cell-modules are connected to (+) terminal post 64. Tabs from all negative electrodes of the cell-modules are connected to the (−) terminal post 63. Terminals 63 and 64 protrude through cover 56 and are sealed with an external compression seal 65.

To provide for rapid gas diffusion at high rates of charge or discharge, each cell has a port 66, provided in housing 50, preferably in cover 56, to allow gas access to the interior of the hydrophobic housing. Port 66 comprises a filter 68 suitably made of a non-wetting porous material, such as GORE-TEX ®, available from W. L. Gore & Associates, Inc. or a plate made of sintered polypropylene particles, which allows gases, in particular, hydrogen gas, to pass freely through filter 68, but will not allow liquid electrolyte to pass through and escape from the cell. Filter 68 is of sufficient area to permit the flow of hydrogen in and out through port 66 without a pressure drop exceeding about 3.4 kPa. The nonwetting character of filter 68 and housing 50 tends to reject the liquid aqueous electrolyte from their surfaces in favor of the components such as electrodes, separators, and absorbers which are typically hydrophilic.

Module rests 58 provide various advantageous features. First, rests 58 conveniently permit stacking a plurality of cell-modules 10 in housing 50 so as to keep components other than the absorber and the screens from standing in electrolyte. Some components, for example, an asbestos separator, are especially susceptible to degradation if standing in electrolyte while not constrained. Second, rests 58 cooperate with wicks 40 and recesses 42 of absorber 18, as well as with the complimentary extensions of screens 20, to provide registration and proper alignment of the plurality of modules 10 within housing 50. As is clearly seen in FIG. 5, wicks 40 have a shape which is complimentary to reservoirs 60 defined by adjacent rests 58. Additionally, reservoirs 60 collect and contain any free electrolyte in housing 50. Wicks 40 may then wick up electrolyte contained in the reservoir 60.

When cell modules 10 have been placed in housing 50 and the appropriate connections and heat sealing effected to form cell 100, a tube is introduced into cell 100 through port 66. Nitrogen gas is flushed through port 66 of cell 100 while electrolyte is introduced via the tube. The electrolyte may be suitably about 20 to 40 percent, preferably 26 percent potassium hydroxide in 1M lithium hydroxide.

Battery

Figure 6:
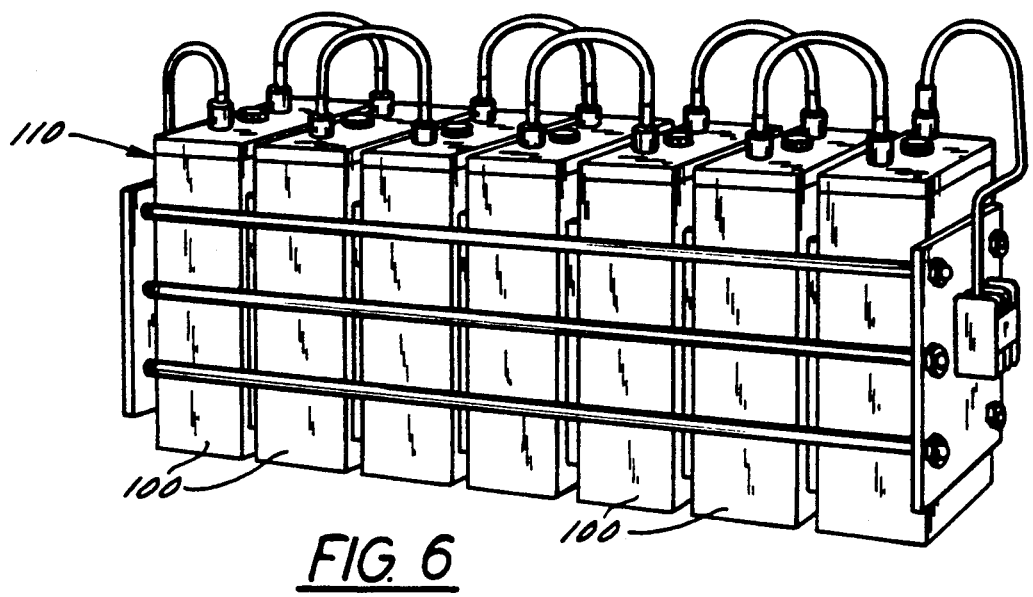
FIG. 6 is a perspective view of a battery comprising a plurality of cells electrically connected.
Figure 7:
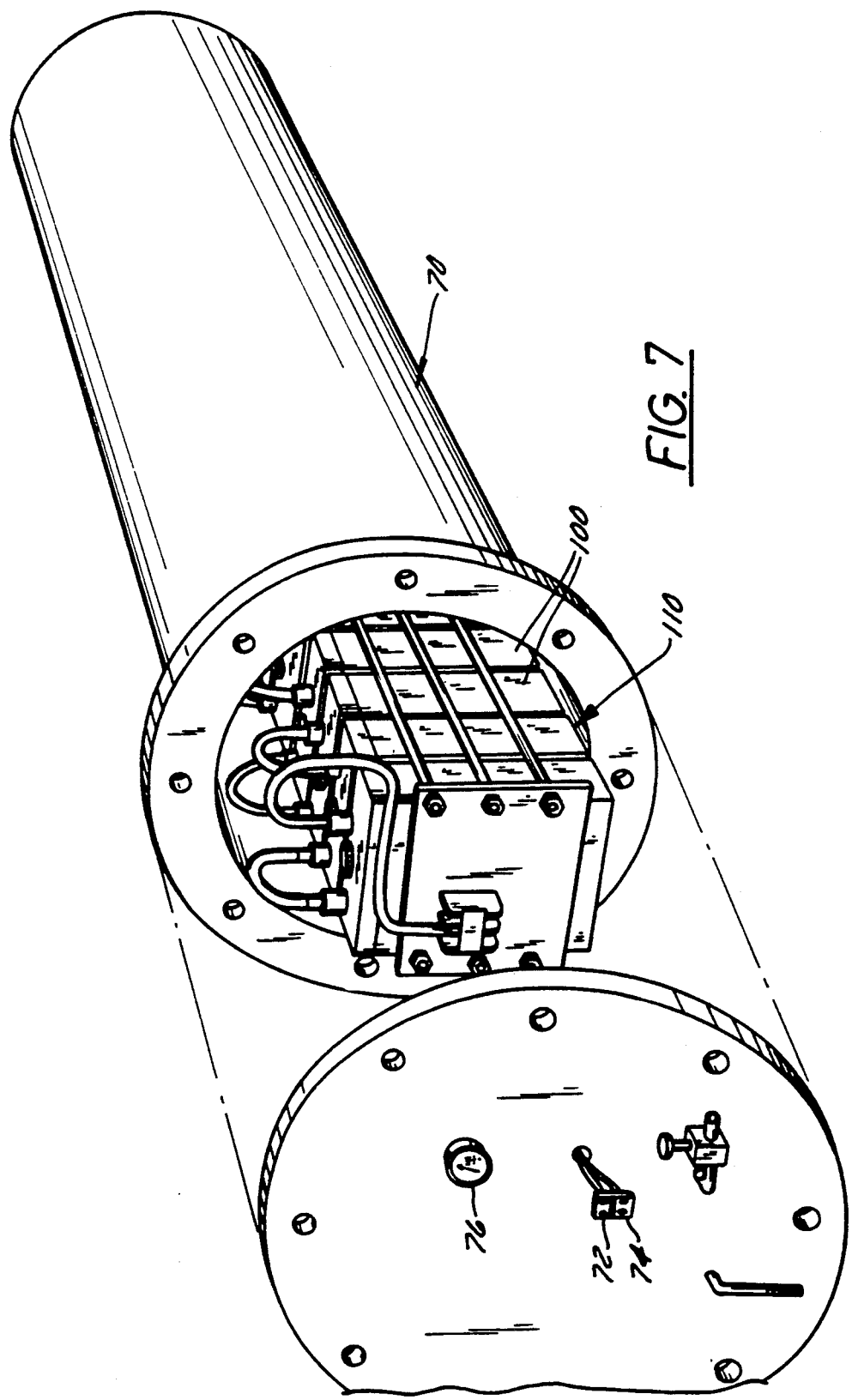
FIG. 7 is an exploded perspective of a single battery being housed in a pressure vessel.

As may be seen in FIG. 6, a plurality of cells 100 in which the appropriate terminals are connected in series and are held together with strapping springs forms a battery 110. Battery 110 then may be placed within a pressure vessel 70 as illustrated in FIG. 7. Pressure vessel 70 may be provided with external terminals 72 and 74 and a state of charge gauge 76. The cell terminals are electrically connected to the external terminal posts of vessel 70. Vessel 70 is suitably constructed of a pressure-resistant and chemically inert material, e.g., a metal such as Alloy 718 INCONEL, commercially available from the International Nickel Co., or a fiber glass reinforced plastic. Vessel 70 is evacuated and then filled with hydrogen to an initial pressure of about 172 kPa to 345 kPa creating a hydrogen gas space which surrounds each cell. Hydrogen enters each cell through its gas port 66. Gas pressures within the vessel may, during operation, typically range from approximately 172 kPa to 2068 kPa. The approximate range of operating temperatures within the vessel is from about 0C° to 50C° above the temperature outside the pressure vessel.

Figure 8:
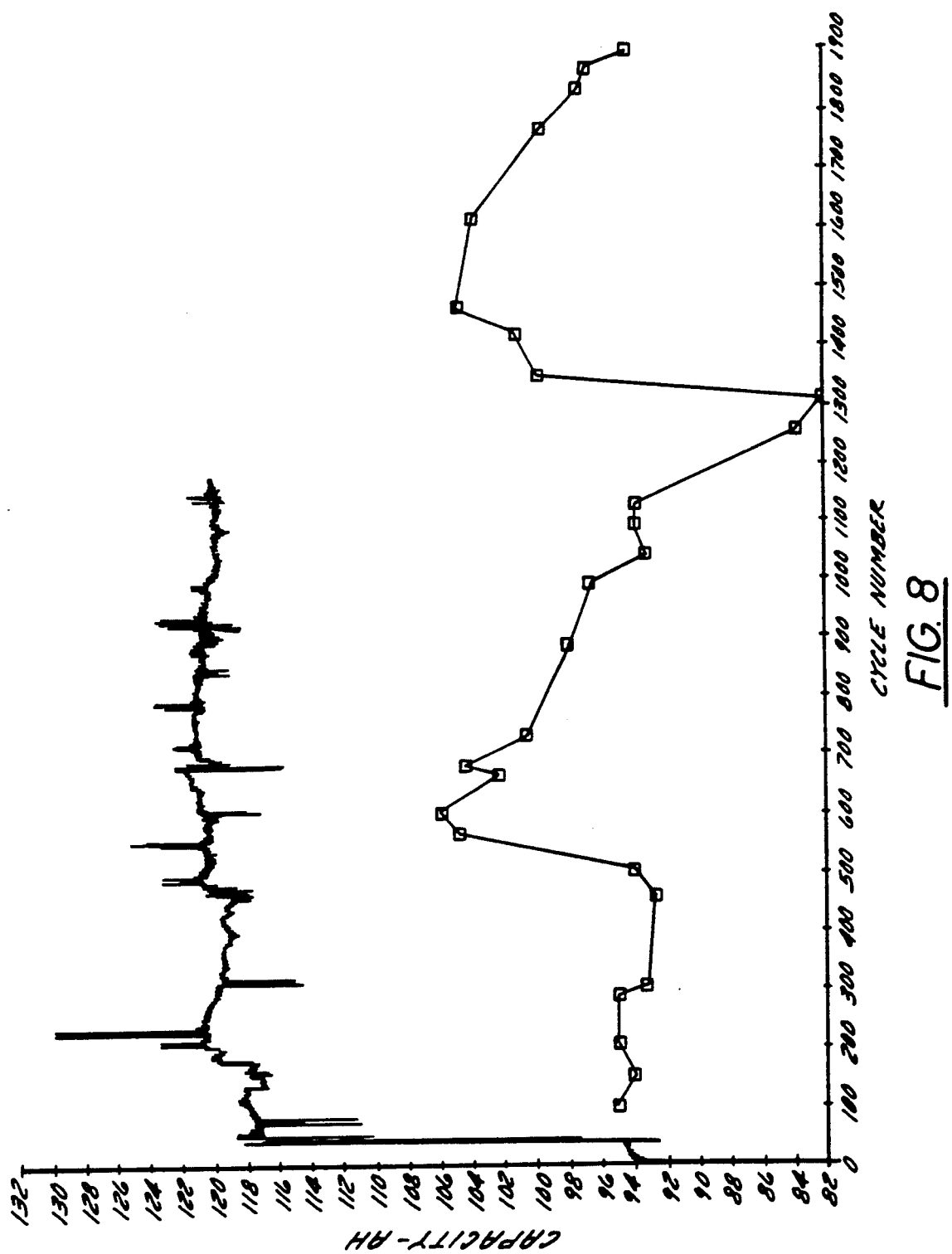
FIG. 8 is a graph plotting cell capacity versus cycle number.

Cells constructed in accordance with the present invention were tested for capacity and compared with cells that did not have the gas and electrolyte management features according to the present invention. Results of these tests are depicted in FIG. 8. The comparative cells were constructed without the absorber between the positive electrodes, and the initial quantity of electrolyte injected into the cell was kept low so as to not contribute to unorderly oxygen recombination, which damages the cells. The data show a substantially flat performance (upper curve) for the cell with gas and electrolyte features according to the present invention with nearly 1,300 cycles of charge and discharge. These cycles consist of discharges to 1.0 v and recharges with 100% of the name plate capacity (usually 80% of the maximum capacity). The charge and discharge rates were C/4, providing three complete cycles per day, where C is the calculated capacity of the electrode in ampere-hours. The comparison cell showed generally declining performance (lower curve; square symbols). At about 1,300 cycles, the cell was opened and additional electrolyte added. Its performance responded appropriately, but began declining again at about 1,500 cycles.

Additionally, cells constructed in accordance with the present invention have been opened and inspected after extension cycling. These cells (a) showed no burn holes in the negative electrode, (b) no dry spots on the positive electrode and (c) no electrolyte trapped within the diffusion screen material used to form the pocket.

In summary, the cooperatively associated oxygen and electrolyte management features according to the present invention allow a nickel-hydrogen cell or battery supplied with sufficient electrolyte, to deliver maximum energy both early in service life and after thousands of cycles. These features include (1) an absorber between the positive electrodes, which wicks up electrolyte from the electrolyte reservoir, and provides for lateral diffusion of electrolyte to the entire surface of each positive electrode; (2) grooves in the surface of positive electrodes positioned against the absorber to allow oxygen which is generated in the positive electrodes to escape to the perimeter of the electrodes, without driving electrolyte out of the separator or the absorber, and to reach the negative electrode for orderly recombination; (3) a cell component enclosing system which utilizes gas diffusion screens as a pocket to properly align components to form individual cell-modules, thus preventing short circuiting, while at the same time, preventing the separator edges from swelling unduly, which would inhibit the orderly recombination of oxygen, and, additionally, facilitating hydrogen gas access to the negative electrode surfaces by providing surface channels for draining electrolyte from between the negative electrodes; (4) a cell housing for cell-modules and electrolyte, the inner surfaces of which promote condensation of water vapor, and thus, maintain the proper electrolyte concentration in the cell and prevent electrolyte bridging; and (5) a gas port in each cell housing to allow flow of gas into and out of the housing without the exit of electrolyte.

Modifications of and substitution within the present invention may be suggested to or made by those of ordinary skill in the art without departing from the scope of the invention as expressed in the appended claims.

Although the invention has been described with reference to nickel-hydrogen cells and batteries, it is apparent to those skilled in the art that the invention may be applied to other metal oxide-hydrogen couples, such as mercury oxide ($HgO_2$)-hydrogen, manganese oxide ($MnO_2$)-hydrogen and silver oxide ($AgO_2$)-hydrogen, without departing from the spirit and scope of the invention.

I claim:

1. A metal oxide-hydrogen cell or battery having gas and electrolyte management features comprising one or more cell-modules, each cell-module having electrolyte and including:
   a plurality of cell units each comprising
   (a) a negative electrode;
   (b) a positive electrode which facilitates oxygen diffusion to said negative electrode; and
   (c) separator means for separating said positive and negative electrodes and holding electrolyte of ionic conductivity disposed between said negative electrode and a first surface of said positive electrode; and
   means for enclosing said cell units, maintaining proper alignment of said electrodes and separator means, permitting passage of hydrogen gas therethrough to each negative electrode, and preventing swelling of separator edges, said enclosing means having a surface configuration adapted to allow electrolyte to drain from a surface of each negative electrode.

2. The cell or battery of claim 1, wherein said surface configuration comprises a plurality of channels therein.

3. The cell or battery of claim 1, wherein said enclosing means includes two gas permeable screens defining a pocket.

4. The cell or battery of claim 3 in which said gas permeable screens are intermittently sealed together along at least a portion of the perimeter thereof.

5. The cell or battery of claim 3, wherein said gas permeable screens made of nonelectrolyte-absorbing material having a porosity of about 50% to 95%.

6. The cell or battery of claim 1, further comprising absorber means in engaging relation with a second surface of each positive electrode for maintaining each positive electrode thoroughly wetted with electrolyte.

7. The cell or battery of claim 6, wherein said absorber means is a material having a capillary potential less than that of said separator and said positive electrode, said material providing passage ways for the electrolyte to each positive electrode.

8. The cell or battery of claim 6, wherein said second surface of said positive electrode has generally parallel grooves for channeling oxygen generated in said positive electrode out from said positive electrode to said negative electrode for recombination.

9. The cell or battery of claim 6, wherein said cell-module comprises a pair of positive electrodes in back-to-back relation between a pair of negative electrodes, said absorber means positioned between said positive electrodes.

10. The cell or battery of claim 3, further comprising housing means for holding one or more cell-modules.

11. The cell or battery of claim 10, wherein said housing means comprises a bottom, sides, a cover, and port means for providing communication to the interior of said housing means disposed within said cover, said port means allowing hydrogen gas therethrough and preventing escape of electrolyte from said housing means.

12. The cell or battery of claim 11 in which said port means includes a filter of nonwettable hydrophobic material.

13. The cell or battery of claim 1, wherein said enclosing means is a pocket having an open end in which said cell units are inserted, which pocket comprises a pair of screens made of a perforated, polypropylene fabric, and means for uniting said screens along superposed edges thereof.

14. A nickel-hydrogen cell or battery having gas and electrolyte management features comprising one or more cell-modules; each cell-module having electrolyte and including:
 (a) a negative electrode;
 (b) a positive electrode adapted to facilitate oxygen diffusion to said negative electrode;
 (c) separator means for separating said electrodes and holding electrolyte for ionic conductivity disposed between a first surface of said negative electrodes and a first surface of said positive electrode; and
 (d) absorber means for maintaining said positive electrode thoroughly wetted with electrolyte in engaging relation with a second surface of said positive electrode; and
 (e) means enclosing said electrodes, separator means, and absorber means for maintaining proper alignment of said electrodes, separator means, and absorber means, permitting hydrogen gas therethrough to said negative electrode, and preventing swelling of separator edges, said means having a surface configuration adapted to allow excess electrolyte to drain from a second surface of said negative electrode.

15. The cell or battery of claim 14, wherein said absorber means is a material having a capillary potential less than that of said separator and said positive electrode, said material providing passageways for the electrolyte to said positive electrode.

16. The cell or battery of claim 14, wherein said surface configuration comprises channels.

17. The cell or battery of claim 14, wherein said second surface of said positive electrode has generally parallel grooves for channeling oxygen generated in said positive electrode out from said positive electrode to said negative electrode for recombination.

18. The cell or battery of claim 14, wherein said enclosing means comprises two gas permeable screens defining a pocket having intermittently sealed edges.

19. The cell or battery of claim 18, wherein said gas permeable screens are made of nonelectrolyte-absorbing material having a porosity of about 50% to 95%.

20. The cell or battery of claim 14, further comprising housing means for holding one or more cell-modules.

21. The cell or battery of claim 14, wherein said housing means comprises a bottom, sides, a cover, and port means for providing passage of hydrogen therethrough and preventing escape of electrolyte from said container means.

22. The cell or battery of claim 14, wherein a cell-module comprises a pair of positive electrodes positioned back-to-back subdivided between a pair of negative electrodes, said absorber means positioned between said positive electrodes, said pair of negative electrodes disposed in a back-to-back arrangement in a stack of multiple cell-modules.

23. The cell or battery of claim 14, wherein said enclosing means is a pocket comprising a pair of screens made of a perforated, polypropylene fabric, and means for uniting said screens along superposed edges thereof, and said absorber means comprises a plate of nonwoven polypropylene.

24. A nickel-hydrogen battery having gas and electrolyte management features, comprising:
 (a) a pressure vessel containing hydrogen gas; and
 (b) one or more cells connected in series disposed within said pressure vessel, each of said cells having a housing having a gas diffusion port for providing passage of the hydrogen gas therethrough into said housing, and containing one or more cell-modules within said housing, each of said cell-modules having electrolyte and comprising:
  (i) a pair of hydrogen catalytic electrodes;
  (ii) a pair of nickel hydroxide electrodes adapted to facilitate oxygen recombination at the negative electrodes, said pair disposed in back-to-back relation between said hydrogen electrodes;
  (iii) separator means for separating said nickel electrode from a hydrogen electrode and holding an electrolyte for ionic conductivity disposed between a first surface of each nickel electrode and a first surface of each hydrogen electrode;
  (iv) absorber means for maintaining the nickel electrodes thoroughly wetted with electrolyte disposed between said nickel electrodes in engaging relation to a second surface of each nickel electrode;
  (v) enclosing means for said electrodes, separator means and absorber means for maintaining alignment of said electrodes, separator means and absorber means, for permitting transport of hydrogen gas therethrough to a second surface of each hydrogen electrode and preventing swelling of edges of said separator, said enclosing means having a surface configuration adapted to allow excess electrolyte to drain from between said second surface of each hydrogen electrode.

25. The battery of claim 24, wherein said second surface of each nickel hydroxide electrode has generally parallel grooves for channeling oxygen generated in said electrodes out from between said electrodes to said hydrogen electrodes for recombination.

26. The battery of claim 24, wherein said second surface of each nickel hydroxide electrode has generally widthwise grooves for channeling oxygen generated in said electrodes out from between said electrodes to said hydrogen electrodes for recombination.

27. The battery of claim 24, wherein said absorber means is a material having a capillary potential less than that of said separator and said nickel electrode, said material providing passageways for the electrolyte to said nickel electrode.

28. The battery of claim 24, wherein said surface configuration comprises a plurality of channels.

29. The battery of claim 24, wherein said enclosing means includes two gas permeable screens, intermittently sealed together along their edges generally defining a pocket.

30. The battery of claim 29, wherein said gas permeable screens are comprised of nonelectrolyte-absorbing material having a porosity of about 50% to 95%.

31. The cell or battery of claim 24, wherein said enclosing means is a pocket comprising a pair of screens made of a perforated, polypropylene fabric, and means for uniting said screens along superposed edges thereof, and said absorber means comprises a plate of nonwoven polypropylene.

32. The cell or battery of claim 31, wherein an edge portion of said absorber plate is interposed between edge portions of said screens in contact therewith.

* * * * *

UNITED STATES PATENT AND TRADEMARK OFFICE
CERTIFICATE OF CORRECTION

PATENT NO.  : 5,059,496

DATED       : October 22, 1991

INVENTOR(S) : John F. Sindorf

It is certified that error appears in the above-identified patent and that said Letters Patent is hereby corrected as shown below:

Abstract, line 22, "absorbhed" should read --absorbed--.

Column 14: line 22, "absorbhed" should read --absorbed--.
   Claim 1, line 10, "of ionic" should read --for ionic--.
   Claim 5, line 2, "screens made" should read
                --screens are made--.

Signed and Sealed this

Second Day of March, 1993

*Attest:*

STEPHEN G. KUNIN

*Attesting Officer*     Acting Commissioner of Patents and Trademarks

UNITED STATES PATENT AND TRADEMARK OFFICE
CERTIFICATE OF CORRECTION

PATENT NO. : 5,059,496

DATED : October 22, 1991

INVENTOR(S) : John F. Sindorf

It is certified that error appears in the above-identified patent and that said Letters Patent is hereby corrected as shown below:

Column 1, the following statement should appear following the title of the patent:

-- The U.S. Government has a paid-up license in this invention and the right in limited circumstances to require the patent owner to license others on reasonable terms as provided for by the terms of Contract No. 16-9925 awarded by the Department of Energy. --

Signed and Sealed this

Sixth Day of April, 1993

Attest:

STEPHEN G. KUNIN

*Attesting Officer*  *Acting Commissioner of Patents and Trademarks*